(No Model.)

L. KOKOCINSKI.
GLASS OR LENS FOR SPECTACLES OR FOLDERS.

No. 564,894. Patented July 28, 1896.

Witnesses:
J. C. Wilson
Maurice J. Simossa

Inventor
Leon Kokocinski,
By Whitman & Wilkinson,
Attys.

UNITED STATES PATENT OFFICE.

LEON KOKOCINSKI, OF LONDON, ENGLAND, ASSIGNOR TO EDWIN POTTER CARPENTER, OF NEW YORK, N. Y.

GLASS OR LENS FOR SPECTACLES OR FOLDERS.

SPECIFICATION forming part of Letters Patent No. 564,894, dated July 28, 1896.

Application filed March 6, 1895. Serial No. 540,742. (No model.)

*To all whom it may concern:*

Be it known that I, LEON KOKOCINSKI, a citizen of the United States of America, at present residing at London, England, have invented certain new and useful Improvements in Spectacle-Lenses, of which the following is a specification.

This invention relates to improvements in glasses or lenses for spectacles, folders, or so-called "pince-nez," or the like; and it has for its object to shade or color the upper part of each glass in a pair of spectacles, &c., in such a manner as to thereby shade the eye from the downwardly-inclined rays of light and yet permit of clear vision through all parts of the lens. Spectacles, folders, &c., made with these glasses or lenses according to my present invention will be found very pleasing and restful to the eye by thus shading the same or partially shading the same without interfering with the clearness of the view.

Reference is had to the accompanying drawings, in which—

Figure 1:
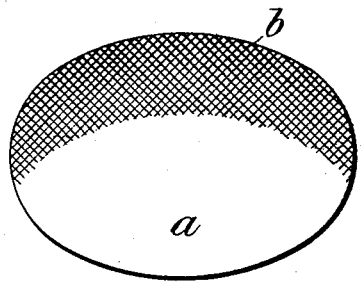
Figure 2:
Figure 3:
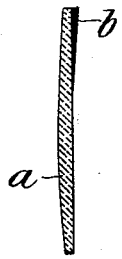
Figure 4:
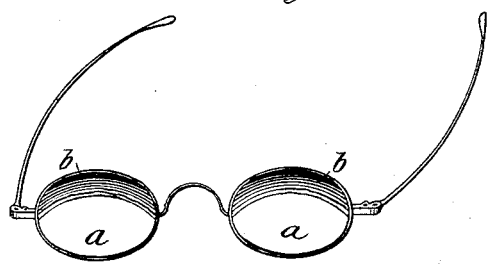

Figure 1 is a plan of a glass or lens according to my present invention before mounting in spectacle frame or holder. Fig. 2 is a top edge view. Fig. 3 is a central cross-sectional view of the lens. Fig. 4 shows a pair of spectacles with lenses manufactured to my present invention mounted therein.

The major part of the lens is without shading or coloring, as at $a$, while the upper portion is shaded or colored, as at $b$.

The darkening or shading of the part or parts of the glass or lens may be effected in any suitable manner; but I prefer the following method of producing same: Take a piece of clear uncolored transparent glass in the form of a sheet and also a piece of shaded or colored glass and lay these two sheets together in the mold so that they are firmly and undivisibly united by heat. Then grind the lower part of the colored or shaded glass so as to leave the uncolored transparent glass $a$ perfectly clear and free from any coloring or shading, while the shaded part $b$ fades away into the part $a$ and serves to shade the eye of the wearer from the light, especially from the bright top light, which would otherwise be thrown on the eye.

Having thus described my invention, what I claim as new, and desire to secure by Letters Patent of the United States, is—

1. A spectacle-lens having the lower and larger part transparent and the upper and smaller part covered with a colored or darkened layer gradually disappearing from the top toward the center of the lens, and arranged to shade or partially shade the eye without interfering with the clearness of the view obtained by the wearer, substantially as described.

2. The combination in a pair of spectacles, folders, pince-nez or the like, of a pair of lenses each of which consists of a transparent uncolored part $a$ and a transparent colored or darkened part $b$ in the form of a lune covering the upper third part of the lens and gradually disappearing from the outer edge of the lens toward the center thereof, substantially as and for the purposes described.

L. KOKOCINSKI.

Witnesses:
HENRY BERKBECK,
ALFRED NUTTING.